(12) United States Patent
Obeyesekere et al.

(10) Patent No.: US 11,338,981 B1
(45) Date of Patent: May 24, 2022

(54) FLEXIBLE PACKAGING HAVING LATERAL STIFFNESS

(71) Applicant: Amazon Technologies, Inc., Seattle, WA (US)

(72) Inventors: Vasitha Nihal Obeyesekere, Seattle, WA (US); Kimberly Sue Houchens, Seattle, WA (US); Alexandra Kay Hartford, Seattle, WA (US); Justine Mahler, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 16/369,655

(22) Filed: Mar. 29, 2019

(51) Int. Cl.
| | | |
|---|---|---|
| B65D 81/03 | (2006.01) | |
| B65D 27/00 | (2006.01) | |
| B65D 27/02 | (2006.01) | |
| B32B 7/022 | (2019.01) | |
| B32B 3/26 | (2006.01) | |

(52) U.S. Cl.
CPC .............. *B65D 81/03* (2013.01); *B32B 3/266* (2013.01); *B32B 7/022* (2019.01); *B65D 27/005* (2013.01); *B65D 27/02* (2013.01); *B32B 2305/02* (2013.01); *B32B 2307/546* (2013.01); *B32B 2553/026* (2013.01)

(58) Field of Classification Search
CPC ...... B65D 81/03; B65D 27/02; B65D 27/005; B65D 81/052; B32B 7/022; B32B 2307/546; B32B 3/266; B32B 2553/026; B32B 2305/028; B32B 7/023; B32B 2305/02
USPC ..................... 206/522; 229/87.02, 92; 383/3
See application file for complete search history.

(56) References Cited

U.S. PATENT DOCUMENTS

| | | | | | |
|---|---|---|---|---|---|
| 2,958,620 | A | * | 11/1960 | Ono ........................ | B65D 81/03 428/156 |
| 3,288,353 | A | * | 11/1966 | Jane ........................ | B65D 81/03 229/87.02 |
| 4,869,939 | A | * | 9/1989 | Santo ...................... | B65D 81/03 428/35.2 |
| 5,762,198 | A | * | 6/1998 | Hung ..................... | B65D 81/052 206/522 |
| 2004/0000581 | A1 | * | 1/2004 | Brandolini .............. | B32B 27/36 229/68.1 |
| 2008/0175522 | A1 | * | 7/2008 | Chuang .................. | B65D 33/06 383/200 |
| 2011/0014433 | A1 | * | 1/2011 | Trani ...................... | D21H 27/30 428/179 |
| 2011/0318522 | A1 | * | 12/2011 | Mueller .................. | B65D 81/03 428/43 |
| 2018/0162597 | A1 | * | 6/2018 | Jobe ....................... | B65D 65/466 |

\* cited by examiner

*Primary Examiner* — Rafael A Ortiz
(74) *Attorney, Agent, or Firm* — BakerHostetler

(57) ABSTRACT

A padded mailer includes elongated air cells that provide stiffness, especially in the transverse direction. The increased stiffness helps prevent the mailer from flipping over during conveying, which would put a label on the underside of the mailer.

20 Claims, 8 Drawing Sheets

FLEXIBLE PACKAGING HAVING LATERAL STIFFNESS

BACKGROUND

This invention is related to packaging, and more particularly to flexible packaging, including mailers or pouches having cushioned sidewalls.

A vast number of items are handled and shipped in envelopes or pouches that have cushioned sidewalls, generally referred to as padded mailers. A conventional padded mailer typically includes a pair of opposing sidewalls having an outer surface of a heavy paper, paperboard, corrugated fiberboard or plastic film. The padding inside the sidewalls is newsprint, foam, air-filled cells, or other cushioning materials. A conventional mailer typically has a folded end, a pair of opposing seams or seals at its lateral edges, and an opening for inserting items.

Sheets of air-filled cells, often referred to as bubble wrap, are formed by thermoforming a first polymer film into cavities on a drum-shaped mold and then laminating another polymer film onto the first film to trap air into the cavities to form air-filled cells. The cells typically are curved (in top view), often hemispherical in shape. Cells can also be cylindrical or conical. LDPE or HDPE or like polymer is often used for the film material.

The cells are arranged in rows, typically with each row is alternating or offset from its adjacent row, which increases the packing density of the rows.

DETAILED DESCRIPTION OF ILLUSTRATIVE EMBODIMENTS

Figure 1:
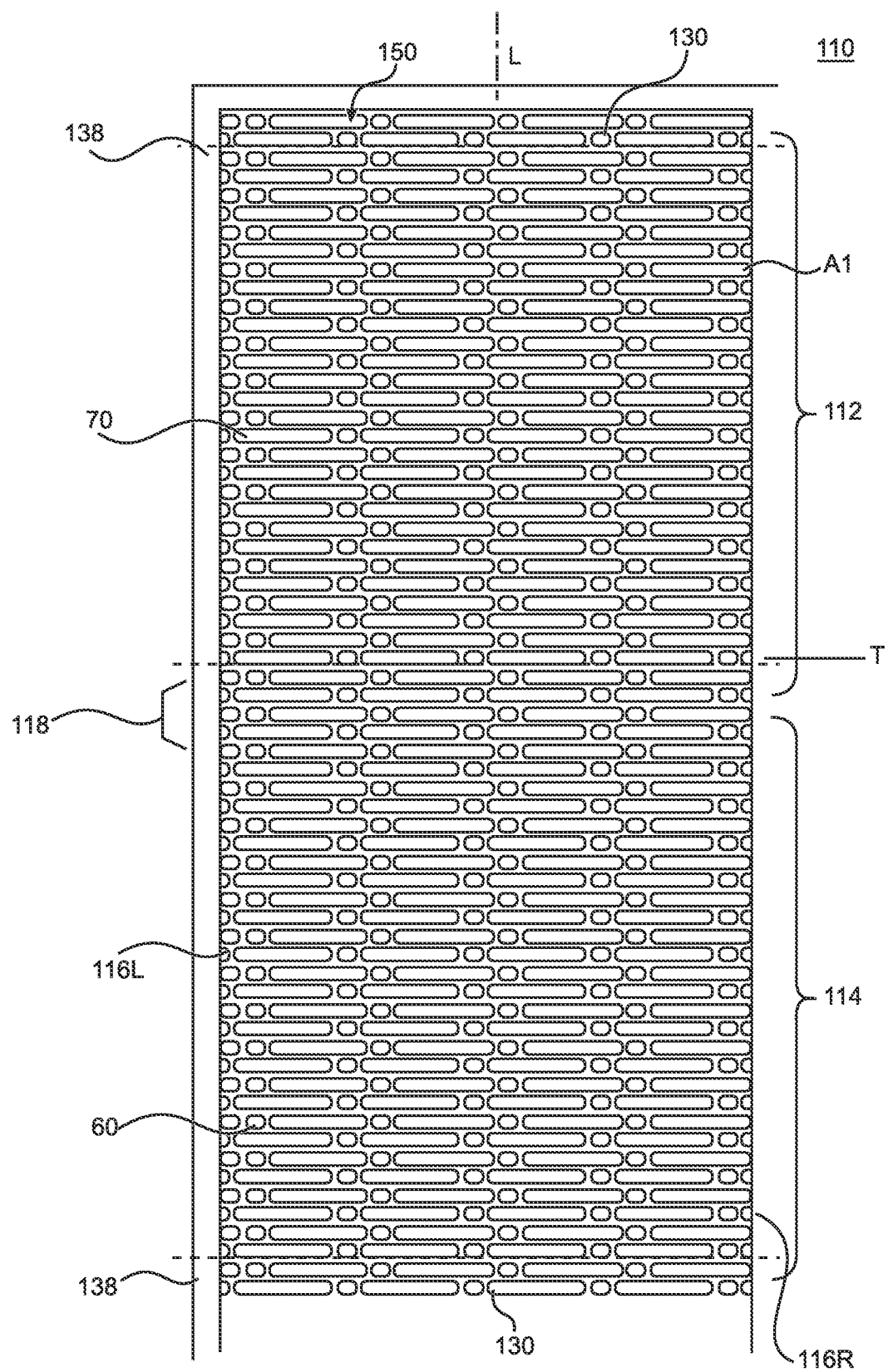
FIG. 1 a view of a first embodiment of a sheet that can be used for forming a mailer, illustrating features for stiffening.

The uniform shape of air-filled cells in padded mailers that are oriented in rows promotes bending in several directions. Because the lands (that is, the portion of the sheet that is between the air-filled cells) have little resistance to bending, a sheet of air-filled cells has very low stiffness in almost any direction. The term stiffness is a measure of the resistance to deformation in response to a force. As used herein, the term stiffness applies to resistance to a force that induces bending in a sheet.

In general, if a packaging designer desires stiffness in a padded mailer, such as to provide protection against bending for an easily-damaged item within the mailer, a paperboard or like structural layer could be used with sufficient thickness to achieve the desired protection. Thus, a padded mailer having a paper or like structural layer was preferred over a padded mailer having a cover-layer of a polymer film, without a paperboard structural layer, when stiffness was required.

But advances in packaging technology and operations have created a new problem relating to padded mailers. As the number of items handled and transported increases, the number of mailers having thin, flexible outer layers has increased. And in this context, the inventors have found that some padded mailers flip over during conveying or other handling, or some padded mailers are unintentionally ejected from conveyors or other handling equipment, such as where direction or speed changes occur during conveying.

Mailers that are ejected from a conveyor are no longer within the automated system, and a mailer that is flipped cannot be read by scanners if the identifying information (such as a bar code or 2D code) is unintentionally on the underside of the mailer.

The inventors have found that certain-shaped items, such as spherical, other items that are tall relative to the mailer dimensions, or flowable items (such as marbles, make the mailer prone to flipping in some circumstances—often about its longitudinal axis. The inventors address this new problem by increasing the lateral stiffness of the mailer, which diminishes the likelihood that the mailers will flip over unintentionally.

The description includes gas-filled features to illustrate the structural or stiffening aspects to flexible packaging, such as integral with the padding of a padded mailer. The present invention is not limited to gas-filled features, as other structural features may be employed by configuring other types of padding to function as stiffeners or gussets, like those described herein.

Further, the term "flexible packaging" is used herein to refer to mailers, pouches, bags, and like packages that have flexible sidewalls, such as (but not limited to) LDPE, HPDE, PLA, PHA Polyesters, PCL polyesters, polyester, nylon, PVC, cellulose-based plastic, starch-based plastic, protein-based plastic, PVA Film, Casein (milk protein); Woven fiber such as Woven Polypropylene or Woven Polyethylene; or fiber construction such as HDPE fiber (such of the type sold under the tradename Tyvek®), Cellulose-based paper (an example of which is sold under the tradename Paptic®), Hemp Fiber, or molded fiber; metal-based sidewalls, such as a metal foil or metalized polymer; or biomaterials and metamaterials (electromagnetic, elastic, acoustic, etc.). or other polyethylene or polymer material, The term "mailer" as used herein refers to any pouch, bag, and the like, including structures that are manufactured with an opening later filling with an item (such mailer 10 of FIG. 8) and mailers that are formed contemporaneously from a sheet, and thus typically have three heat sealed edges and a folded edge (such as mailer 10' in FIG. 9).

Figure 8:
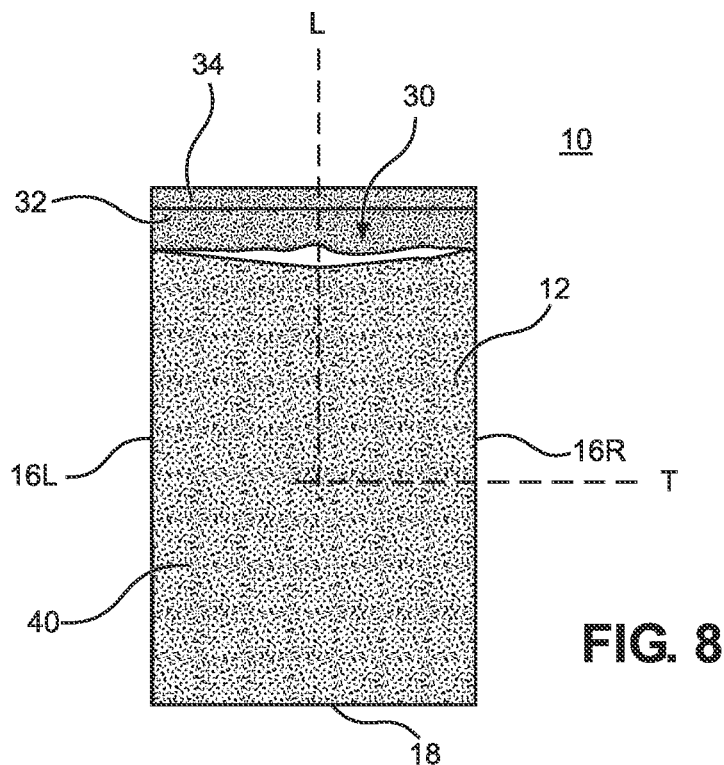
FIG. 8 is a top view of a mailer, such as can be formed from any of the sheets.

Referring to FIG. 8, an example of an open-ended padded mailer 10 includes an upper sidewall 12 and an underside sidewall 14 (not shown in FIG. 8). Sidewalls 12 and 14 are joined together at lateral seams 16L and 16R. Sidewalls 12 and 14 are also joined together at a fold 18 at the bottom of mailer 10. On the opposing side of bottom fold 18 are edges of the sidewalls 12 and 14 that form an opening 30.

A tab 32 extends from above opening 30, which after filling mailer 10 with an item, can be folded over to enclose mailer 30. A self-adhesive, as illustrated in the FIG. 8 a peel-and-stick strip 34 is located on the inboard side to enable tab 32 to be affixed to an exterior of sidewall 12. Mailer 10 forms a longitudinal axis L and a transverse axis T.

Figure 9:
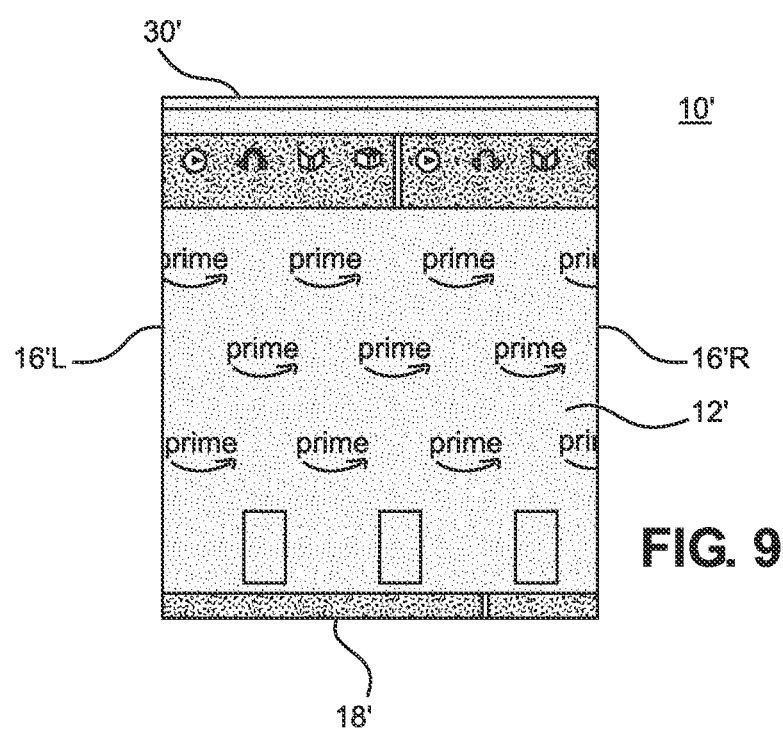
FIG. 9 is a top view of another mailer embodiment such as can be formed from any of the sheets.

FIG. 9 is an example of a closed-ended padded mailer 10' that includes an upper sidewall 12' and an underside sidewall 14' (not shown in FIG. 9). Sidewalls 12' and 14' are joined together at lateral seams 16'L and 16'R, which are identified in FIG. 9 by dashed lines. Sidewalls 12' and 14' are also joined together at a fold 18' at the bottom of mailer 10'. On the opposing side of bottom fold 18' is a seam 30' that fully encloses mailer 10'. Accordingly, an item is inserted into mailer 10' during the process of forming the seams of mailer 10'. A perforation, tear strip, or other opening means may be formed at seam 30'. Mailer 10 forms a longitudinal axis L and a transverse axis T.

A cover layer 40, as illustrated in the Figures, preferably is a conventional polymer film, such as LDPE or the like, or any of the materials listed above for flexible packaging. A padded layer 50 (optional) is within cover layer 40. Padded layer 50 in the embodiment of the figures includes gas-filled cells that perform the cushioning function. It is understood that the term "gas-filled" used herein is typically air-filled.

Figure 10A:
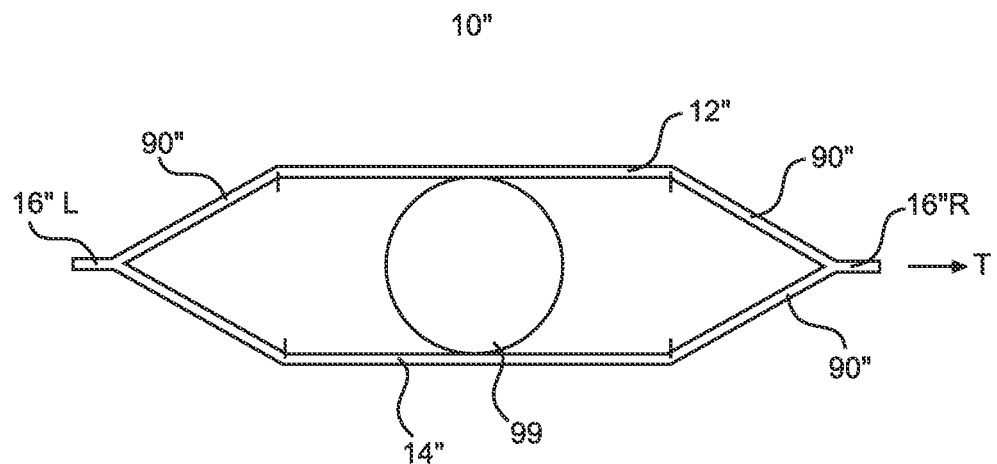
FIG. 10A is a schematic cross-sectional view of a mailer 10' illustrating an item inside of a mailer to illustrate the function of any of the stiffening features.
Figure 10B:
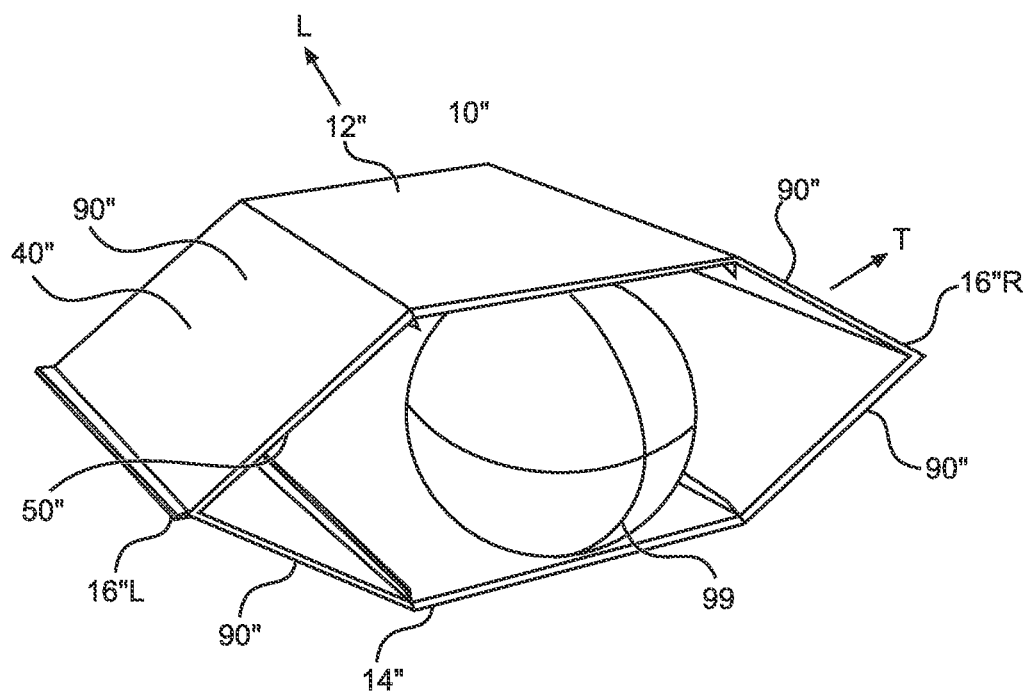
FIG. 10B is a cross-sectional, perspective view of the mailer of FIG. 10A.

FIGS. 10A and 10B illustrate an example of a filled, sealed padded mailer 10" that includes an upper sidewall 12" and an underside sidewall 14". The term "underside" as used herein is merely for reference to identify the sides when in the particular orientation illustrated in the figures, as the figures show a mailer without a label. In circumstances in which the structural features described herein are beneficial to address the flipping problem, the term "underside" can used to refer to the side opposite the label. Sidewalls 12" and 14" are joined together at lateral seams 16"L and 16"R and at upper seal 30". Sidewalls 12" and 14" are also joined together at a fold 18" at the bottom of mailer 10". Mailer 10" forms a longitudinal axis L and a transverse axis T.

A cover layer 40", as illustrated in the Figures, preferably is a conventional polymer film, such as LDPE, HDPE, or the like, or any of the materials listed above for flexible packaging. A padded layer 50" (optional) is within cover layer 40". Padded layer 50" in the embodiment of the figures includes gas-filled cells that perform the cushioning function. The cells illustrated in the figures illustrated as gas filled, and other configurations and structures of cells for forming stiffening members are contemplated, in accordance with any means for achieving the lateral stiffness described herein. Accordingly, the term cell is not intended to be limited to hollow structures, but encompasses polymer and other materials.

FIGS. 1 through 7 illustrate embodiments of sheets of material that can be formed into a mailer, as illustrated in FIGS. 8 and 9. Each embodiment has a prefix 1 through 7, followed by a two-digit reference number that is used consistently throughout the specification. Each of the sheets in the figures is formed by folding the sheet near its midpoint 18 (such as 118 in FIG. 1, 218 in FIG. 2, etc.) to place edges 16L and 16R together for heat sealing for forming the seam. Edges 30 are brought together to form the opening of the mailer, as in either FIG. 8 or FIG. 9, or the like.

The embodiments of the figures provide examples of structures (such as but not limited to padded structures) that change the stiffness of the mailer. The present invention is not limited to the particular structures shown in the figures, but rather encompass variations and combinations that will be clear to persons familiar with mailer technology in view of the disclosure of the stiffening aspects herein.

Referring to FIG. 1, sheet 110 includes a cover layer on the underside (not shown in the figures) and padded layer 150. Layer 150 includes rows of elongated gas-filled cells 170 and round cells 160. Each row includes alternating elongated cells 160 and round cells 160. Elongated cells define a longitudinal axis A1 that is parallel to the transverse direction T. The terms "elongated cells" and "round cells" refer to the shape of the cells in top view. The term "round" as used herein encompasses circles, ovals, ellipses, and like geometry. In some cases, the round cells will not have straight sides, but rather be continuously curved. In other cases, the round cells will be distinguished from elongated cells merely by relative length in the longitudinal direction.

A first portion 112 of rows of cells 160 and 170 form a first one of the sidewalls of the mailer (corresponding to reference number 12 in FIG. 8). A second portion 114 of rows of cells 160 and 170 form a second one of the sidewalls of the mailer (corresponding to reference number 14 of FIG. 8). A portion 118 of the rows form the bottom of the mailer (corresponding to reference number 18 of FIG. 8). Edges 116L and 116R form the opposing lateral edges of the mailer (corresponding to reference number 16L and 16R of FIG. 8). Thus, transverse rows of alternating cells 160 and 170 fill the entire surface of layer 150 between edges 116L and 116R and opposing free edges 130 (corresponding to reference number 30 in FIG. 8).

The elongated cells 170 oriented in the transverse direction T provide increased stiffness in the direction T, as the structure of the elongated cells acts as a gusset or stiffener oriented in direction T. Accordingly, the orientation of elongated cells 170 provides little increase in resistance to bending along direction T (that is, rotating edges 230 toward bottom 218). The particular parameters of elements of sheet 110, such as material thickness, stiffness chemistry, and properties; cell height, width, spacing, cross sectional shaped, and length; and like parameters may be chosen according to the desired goals of the mailer including the desired stiffness in the transverse direction.

Registration elements 138, illustrated as dashed lines, enable the registration of sheet 110 in a pouch-making machine, which is known in the art.

The reference number system of a first digit representing the embodiment number and two digits representing structure or locations will be used for the embodiments of FIGS. 2 through 7 without repeating the explanation of corresponding structure.

Figure 2:
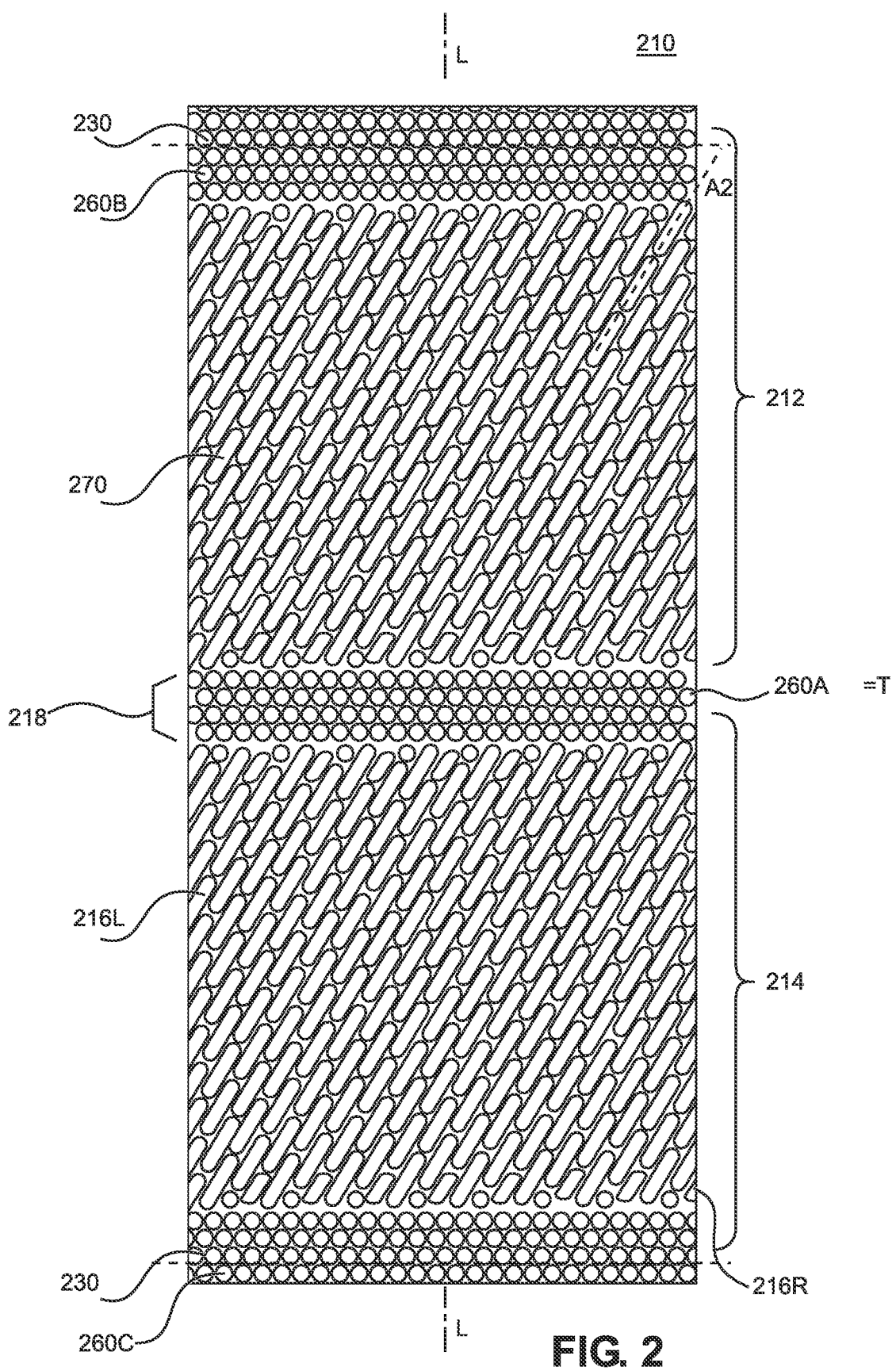
FIG. 2 is a view of a second embodiment of a sheet.

FIG. 2 illustrates a sheet 210 that includes a cover layer on the underside (not shown in the figures) and padded layer 250. Layer 250 includes rows of elongated gas-filled cells 270 that are oriented at an axis A2, which is oblique to longitudinal axis L. Elongated cells 270 fill portions 212 and 214 from edges 216L to 216R, essentially filling the portions of sheet 210 that become the sidewalls 12 and 14 of the mailer.

Layer 250 also includes round cells 260a that fill the bottom portion 218 of sheet 210, round cells 260b fill each opposing edge 230 of sheet 210. Circular cells 260a and 260b are used in areas where low stiffness is desired, such as the fold at portion 218 and the opening at 230.

The area and locations of the sheet 210 filled with cells 270 and the angle A2 relative to the longitudinal line L may be chosen in accordance with other parameters, such as material thickness, stiffness chemistry, and properties; cell height, width, spacing, cross sectional shaped, and length; and like parameters according to the desired goals of the mailer, including the desired stiffness in the transverse direction.

Registration elements 238, illustrated as dashed lines, enable the registration of sheet 210 in a pouch-making machine, which is known in the art.

Figure 3:
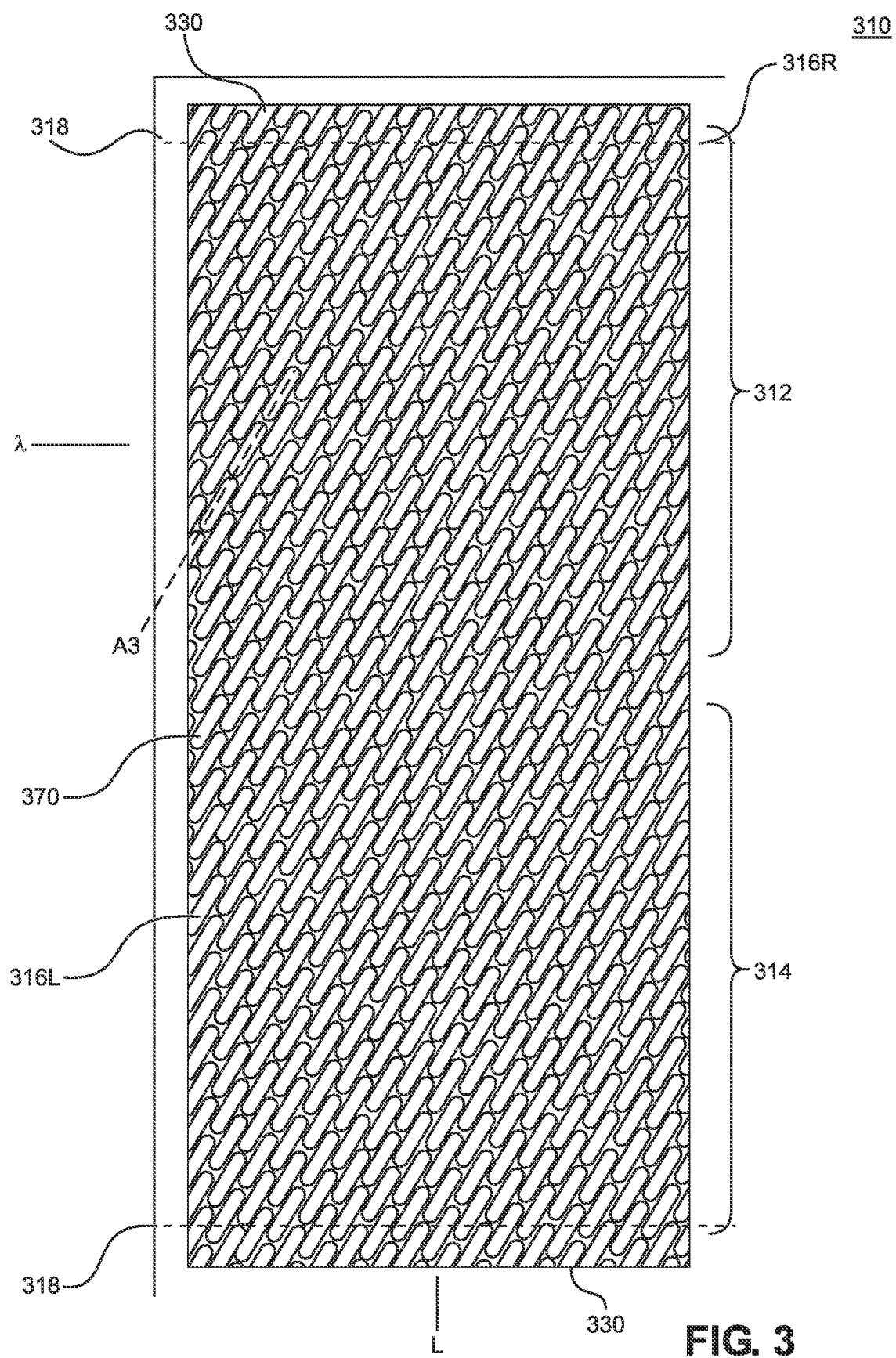
FIG. 3 is a view of a third embodiment of a sheet.

FIG. 3 illustrates sheet 310 that includes a cover layer on the underside (not shown in the figures) and padded layer 350. Layer 350 includes rows of elongated gas-filled cells 370 that are oriented at an axis A3 which is oblique to longitudinal axis L. Elongated cells 370 fill portions 312 and 314 between edges 316L to 316R and between opposing free edges 330, essentially filling the portions of sheet 310 that become the sidewalls 12 and 14 and bottom 18 of the mailer.

The angle A3 relative to the longitudinal line L may be chosen in accordance with other parameters, such as material thickness, stiffness chemistry, and properties; cell height, width, spacing, cross sectional shaped, and length; and like parameters according to the desired goals of the mailer, including the desired stiffness in the transverse direction.

Registration elements 338, illustrated as dashed lines, enable the registration of sheet 310 in a pouch-making machine, which is known in the art.

Figure 4:
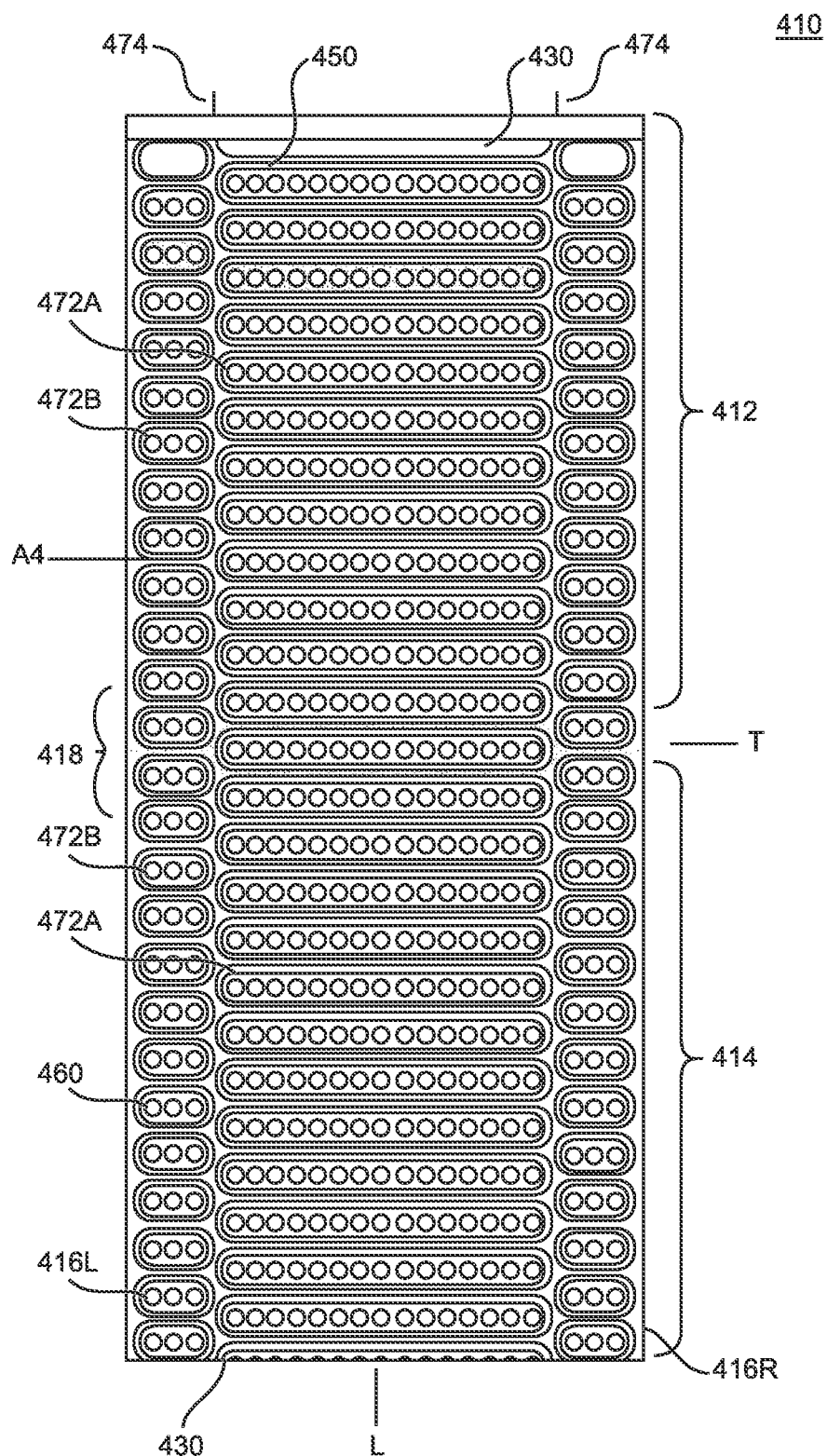
FIG. 4 is a view of a fourth embodiment of a sheet.

FIG. 4 illustrates a sheet 410 that includes a cover layer on the underside (not shown in the figures) and padded layer 450. Layer 450 includes rows of elongated gas-filled round cells 460 that are oriented parallel to the transverse direction T.

Sheet 410 further includes pods or elongated cells 472a and 472b that encompass several round cells 460 aligned in an array. First pods 472a span most of the width between edges 416L and 416R. Second pods 472b are shorter than first pods 472a and located on or adjacent to the peripheral edges 416L and 416R.

Each pod 472a and 472b is gas-filled, and encompasses arrays of round cells 460. Pods 472a, 472b are oriented parallel to transverse direction T and thus stiffen the sheet 410 (and the corresponding mailer) from bending or deformation about the longitudinal direction L.

Because interfaces 474 between pods 472a and 472b are near edges 416L and 416R, and because the interfaces form a longitudinal line without stiffening, the interfaces 474 form hinges that promote deformation of the mailer after filling with a product. In the embodiment of the figures, pods 472a and 472b are transversely oriented, and thus form a hinge that promotes forming a fold at 418. The pods shown herein may also be oriented at an acute angle relative to directions L and T, and the pods may be combined with other cell structures disclosed herein.

The combination of pods 472a, 472b and round cells 460 enables a hybrid stiffening effect, as the pods act as stiffeners or gussets, and the round cells within the pods provide cushioning but little stiffening themselves. Accordingly, the configuration of pods 472a, 472b and round cells 460 may be chosen in accordance with other parameters, such as material thickness, stiffness chemistry, and properties; cell height, width, spacing, cross sectional shaped, and length; and like parameters according to the desired goals of the mailer, including the desired stiffness in the transverse direction.

Registration elements 438, illustrated as dashed lines, enable the registration of sheet 410 in a pouch-making machine, which is known in the art.

Figure 5:
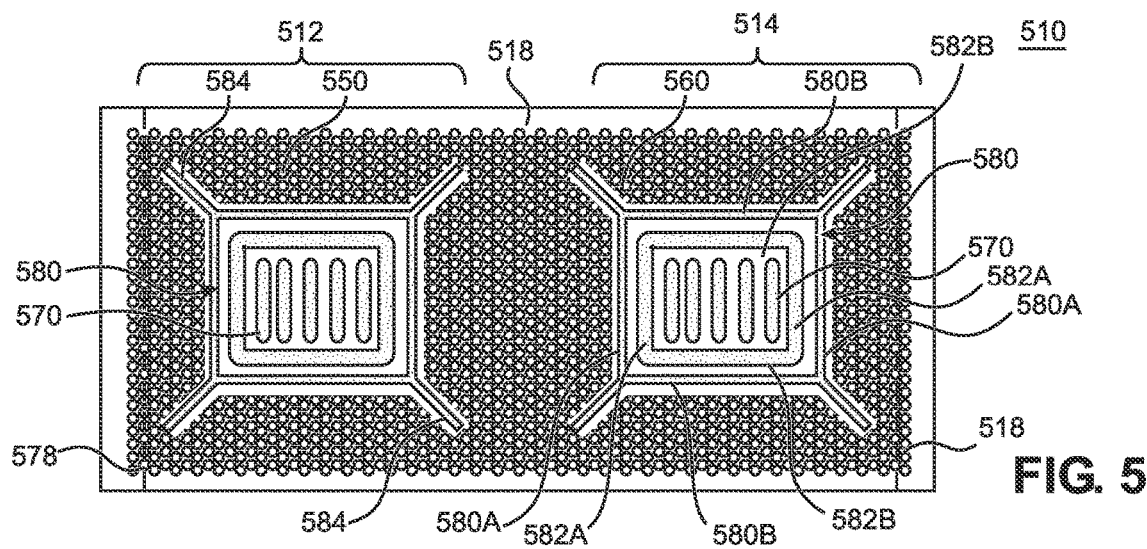
FIG. 5 is a view of a fifth embodiment of a sheet.

FIG. 5 a sheet 510 that includes a cover layer on the underside (not shown in the figures) and padded layer 550. Layer 550 includes an example of a geometric shape of elongated gas-filled round cells 580 in a field of round cells 560. Portions of geometric shape 580 are referred to by reference number 580 with an appended letter.

Shape 580 in the embodiment of FIG. 5 has a rectangular shape formed by transverse elongated cells 580a and longitudinal elongated cells 580b. Cells 580a and 580b may be continuous such that the passages within the cells are connected. Another rectangular cell structure 582 is offset and within rectangular cell 580. Additionally, gas-filled cell projections 584 extend from the corners of cell 580 at the junction of cells 580a and 580b. In the embodiment shown, the projections are oriented at approximately 45 degrees from each of directions L and T.

Cell structure 582 is formed by transverse elongated cells 582a and longitudinal elongated cells 582b. Cells 582a and 582b may be continuous such that the passages within the cells are connected. Within cell structure 582, elongated gas-filled cells 570 are oriented to be parallel with transverse direction T. The combination of cell 580, cell 582, and transverse elongated cells 570 are located approximately in the center of areas 512 and 514, which correspond to mailer sidewalls 12 and 14.

The combination of cells 580, 582, 560 and 570 enable a wide range of variations in the stiffnesses to be achieved at desired locations of the sheet and mailer, consistent with the stiffening and hinging functions related to elongated and round cells described herein.

Accordingly, the configuration of gas-filled 560, 570, 580, and 582 may be chosen in accordance with other parameters, such as material thickness, stiffness chemistry, and properties; cell height, width, spacing, cross sectional shaped, and length; and like parameters according to the desired goals of the mailer, including the desired stiffness in the transverse direction.

Registration elements 538, illustrated as dashed lines, enable the registration of sheet 450 in a pouch-making machine, which is known in the art.

Figure 6:
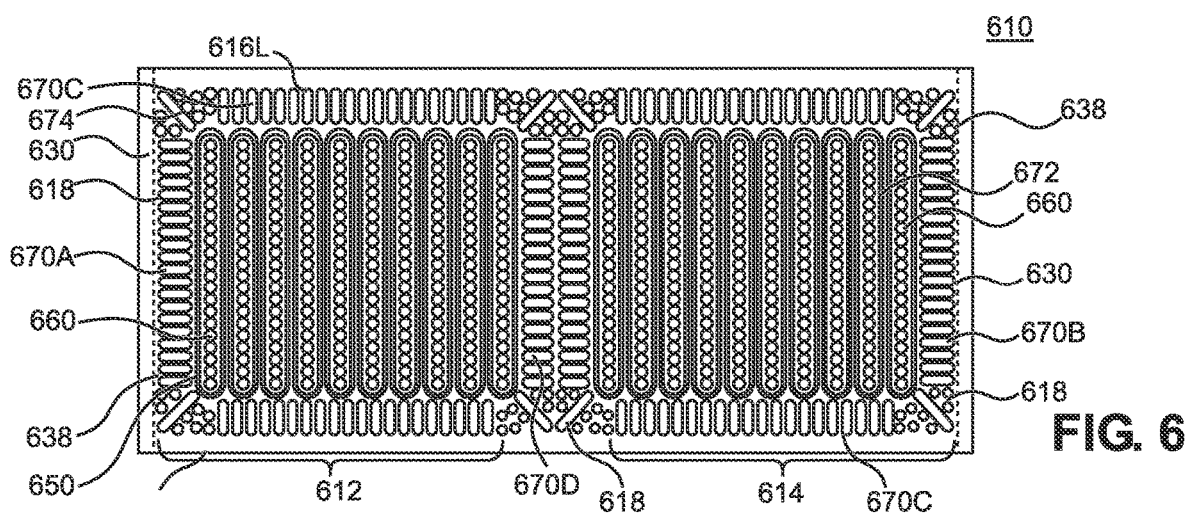
FIG. 6 is a view of a sixth embodiment of a sheet.

FIG. 6 illustrates a sheet 610 that includes a cover layer on the underside (not shown in the figures) and padded layer 650. Layer 650 includes transverse rows of circular gas-filled cells 660, transverse gas-filled pods 672, and elongated gas-filled cells 670a, 670a, 67d, and 670d.

Pods 672 encompass an array of the round cells 660 and span most of the distance between 616L and 616R and between edges 630. Longitudinal elongated cells 670a and 670b are at or near the free edges 630. Transverse elongated cells 670c are at or near side edges 616L and 616R such that the elongated cells are a border around the pods. Further, longitudinal cells 670d are located at bottom 618.

Thus, a first group of pods corresponds to most of the area of sidewall 12 and a second group of pods corresponds to most of the area of sidewall 14. The space between adjacent arrays of bottom elongated cells 670d provides a hinge for promoting forming the fold 18 of the mailer. The space between edge elongated cells 670c and the ends of pods 672 forms a hinge adjacent to each seam 16L and 16R of the mailer. Round cells 660 and an angled elongated cell 674 may be formed at each corner of sheet 610 to promote stiffness and cushioning as desired.

The combination of pods 672a, 672b and round cells 660, and elongated border cells 670a, 670b, 670c, and 670d enables a hybrid stiffening effect, as the pods act as stiffeners or gussets, and the round cells within the pods provide cushioning but little stiffening themselves. Accordingly, the configuration the elements shown in FIG. 6 may be chosen in accordance with other parameters, such as material thickness, stiffness chemistry, and properties; cell height, width, spacing, cross sectional shaped, and length; and like parameters according to the desired goals of the mailer, including the desired stiffness in the transverse direction.

Registration elements 638, illustrated as dashed lines, enable the registration of sheet 610 in a pouch-making machine, which is known in the art.

Figure 7:
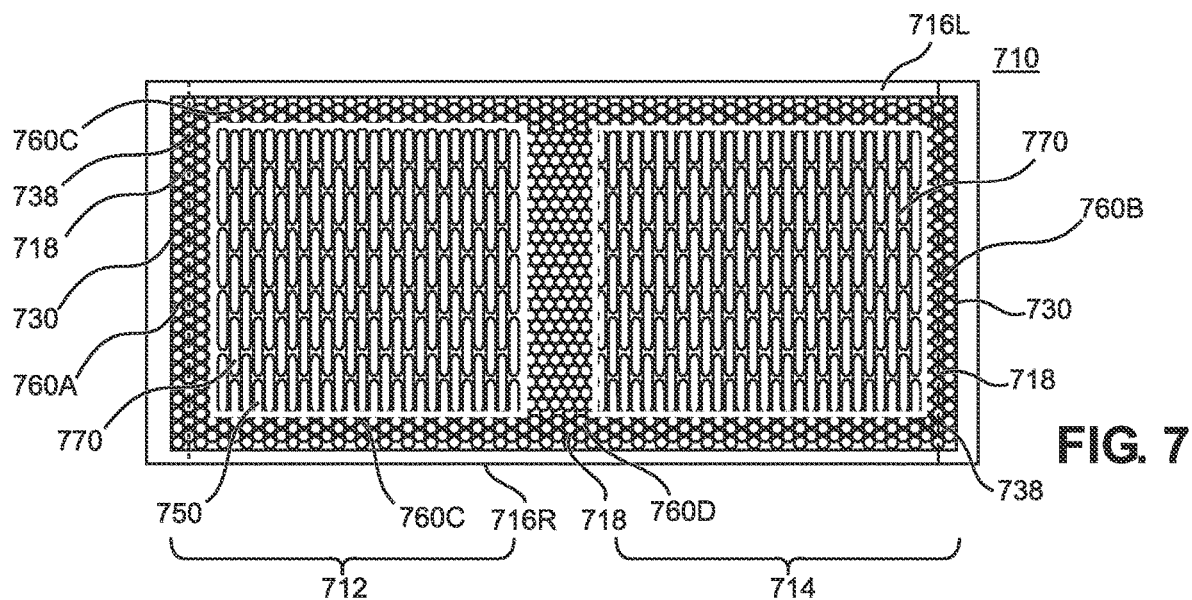
FIG. 7 is a view of a seventh embodiment of a sheet.

FIG. 7 illustrates a sheet 710 that includes a cover layer on the underside (not shown in the figures) and padded layer 750. Layer 750 includes rows of transverse elongated gas-filled cells 770 and circular gas-filled cells 760a-760d.

Transverse elongated cells 770 form a field that corresponds to most of the area of mailer sidewalls 12 and 14. Cells 770 are bounded on all sided by the round cells. Round cells 760a and 760b are formed at free edges 730. Round cells 760c form a border on the side edges 716L and 716R. Round cells 760d are formed between the two sets of transverse cells 770 that at location 718 that corresponds to the bottom of the mailer.

The elongated cells 770 oriented in the transverse direction T provide increased stiffness in the direction T, as the structure of the elongated cells acts as a gusset or stiffener oriented in direction T. Accordingly, the round cells 760d at bottom 718 provide little increase in resistance to bending parallel to longitudinal axis L to promote forming the fold corresponding to fold 18 of the mailer. The peripheral round cells 760c at edges 716L and 716R form a hinge adjacent to each seam 16L and 16R of the mailer. Round cells 760a and 760b promote bending at mailer opening 30.

The particular parameters of elements of sheet 710, such as material thickness, stiffness chemistry, and properties; cell height, width, spacing, cross sectional shaped, and length; and like parameters may be chosen according to the desired goals of the mailer including the desired stiffness in the transverse direction.

Registration elements 738, illustrated as dashed lines, enable the registration of sheet 710 in a pouch-making machine, which is known in the art.

Referring again to FIGS. 10A and 10B to illustrate the function of the lateral stiffening structures described herein, the mailer 10", which is illustrated in cross section, has a spherical item 99 housed within the mailer. Each sidewall 12" and 14" in the embodiment of the figures includes a cover layer 40" and a padded layer 50". Sidewalls 12" and 14" deflect or hinge to receive item 99. Portions of sidewalls 12" and 14" are identified by reference number 90" to refer to stiffened portions. In some circumstances, stiffened portions 90' will resist bending or deforming if mailer 10" would tend to flip over either end 16"R or 16"L, rather than merely bending with no resistance.

The registration elements referred to herein may be any type, such as (for non-limiting example, holes into which pins of the pouch-making machine may be inserted, visual marks that are sensed by visual sensors, or any other conventional registration mechanism, as understood by persons familiar with packaging machinery and processes.

The sheets 110 through 710 are intended to fed from a continuous roll during the formation of the mailers from the sheets. For example, a roll of the sheet 110-710 may be fed downwardly and partially folded at area 118 through 718. The hinges and like features of the cells described above promote the folding process.

Then the edges are heat sealed for enclose three sides to complete the formation of the mailer 10. Preferably the self-adhesive strip 34 is pre-formed on the roll of material. Alternatively, after folding, a first edge can be heat sealed, and then an item inserted into the package before sealing the second edge and the mouth of the package. The present invention has been described by employing examples of structure and function of the gas-filled structures and mailers. The present invention is not intended to be limited to the particular structure or function of the structures disclosed herein unless expressly stated in the claims. Rather, the invention encompasses the structure(s) and function(s) defined in the claims and understood by persons familiar with packaging technology. For non-limiting example, the dimensions and materials may be chosen according to the particular goals of the mailer according to well understood principles. The features of the various embodiments may be combined with one another according to the broad interpretation of the teachings in the specification and claims. Further, advantages of the structure and function have been described for context of the invention only. It is not intended that the present invention be limited to any advantage unless expressly stated in the claims.

What is claimed is:

1. A mailer comprising:
   a flexible cover layer extending along a longitudinal direction and a transverse direction; and
   an inner, padded layer including first elongate cells and second cells,
   wherein the first elongate cells are longer in the transverse direction than in the longitudinal direction,
   wherein the second cells have a circular shape,
   wherein the inner, padded layer includes at least two first elongate cells and at least one second cell between the at least two first elongate cells along a transverse axis that is parallel to the transverse direction, and
   wherein a stiffness of the inner, padded layer in the transverse direction is greater than a stiffness of the inner, padded layer in the longitudinal direction.

2. The mailer of claim 1, wherein the first elongate cells and the second cells are gas-filled cells.

3. The mailer of claim 1, wherein the flexible cover layer and the inner, padded layer are folded at a bottom edge to form a first sidewall and second sidewall opposing the first sidewall.

4. The mailer of claim 1, wherein the inner, padded layer is on an inner surface of the flexible cover layer.

5. The mailer of claim 1, wherein the first elongate cells and the second cells alternate along the transverse axis.

6. The mailer of claim 1, wherein the mailer comprises a polymer.

7. The mailer of claim 1, wherein each of the flexible cover layer and the inner, padded layer are continuous.

8. The mailer of claim 1, further comprising registration elements configured to register the flexible cover layer relative to a machine.

9. The mailer of claim 8, wherein the registration elements are holes in the flexible cover layer that are configured to receive pins to register the flexible cover layer in the machine.

10. The mailer of claim 8, wherein the registration elements are visual markings on the flexible cover layer that are adapted to be visible to a sensor of the machine.

11. The mailer of claim 3, wherein the flexible cover layer and the inner, padded layer are folded along an axis parallel to the transverse axis.

12. The mailer of claim 3, further defining an opening between upper edges of the first sidewall and the second sidewall.

13. The mailer of claim 1, wherein the longitudinal direction is perpendicular to the transverse direction.

14. A mailer comprising:
   an upper sidewall; and
   a lower sidewall, the upper sidewall being joined to the lower sidewall along two edges extending in a longitudinal direction and a bottom edge extending in a transverse direction that is perpendicular to the longitudinal direction, such that upper edges of the upper sidewall and the lower sidewall define an opening, wherein each of the upper sidewall and the lower sidewall comprises:

a flexible cover layer, and an inner, padded layer including first elongate cells and second cells, wherein the first elongate cells are longer in the transverse direction than in the longitudinal direction, wherein the second cells have a circular shape, and wherein the inner, padded layer includes at least two first elongate cells and at least one second cell between the at least two first elongate cells along a transverse axis that is parallel to the transverse direction, wherein a stiffness of mailer in the transverse direction is greater than a stiffness of the mailer in the longitudinal direction.

15. The mailer of claim 14, wherein the first elongate cells and the second cells are gas-filled cells.

16. The mailer of claim 14, wherein the first elongate cells and the second cells alternate along the transverse axis.

17. The mailer of claim 14, wherein the mailer comprises a polymer.

18. The mailer of claim 14, further comprising registration elements configured to register the flexible cover layer relative to a machine.

19. The mailer of claim 18, wherein the registration elements are holes in the flexible cover layer that are configured to receive pins to register the flexible cover layer in the machine.

20. The mailer of claim 18, wherein the registration elements are visual markings on the flexible cover layer that are adapted to be visible to a sensor of the machine.

* * * * *